United States Patent
Biswas et al.

(10) Patent No.: US 8,295,607 B1
(45) Date of Patent: Oct. 23, 2012

(54) ADAPTIVE EDGE MAP THRESHOLD

(75) Inventors: Mainak Biswas, Santa Cruz, CA (US);
Vipin Namboodiri, Bangalore (IN)

(73) Assignee: Marvell International Ltd., Hamilton (BM)

( * ) Notice: Subject to any disclaimer, the term of this patent is extended or adjusted under 35 U.S.C. 154(b) by 789 days.

(21) Appl. No.: 12/490,639

(22) Filed: Jun. 24, 2009

Related U.S. Application Data

(60) Provisional application No. 61/079,266, filed on Jul. 9, 2008.

(51) Int. Cl.
- *G06K 9/48* (2006.01)
- *G06K 9/62* (2006.01)
- *G06K 9/38* (2006.01)
- *G06K 9/46* (2006.01)
- *G06K 9/66* (2006.01)

(52) U.S. Cl. ........ 382/199; 382/224; 382/270; 382/192; 382/194

(58) Field of Classification Search .......... 382/199, 382/224, 270, 271, 192, 194
See application file for complete search history.

(56) References Cited

U.S. PATENT DOCUMENTS

| | | | |
|---|---|---|---|
| 6,323,956 B1 * | 11/2001 | Rudak et al. | 358/1.2 |
| 6,778,699 B1 * | 8/2004 | Gallagher | 382/165 |
| 7,982,798 B2 * | 7/2011 | Adams | 348/448 |
| 2005/0169531 A1 * | 8/2005 | Fan | 382/199 |
| 2006/0153447 A1 * | 7/2006 | Ouchi | 382/173 |
| 2008/0024618 A1 * | 1/2008 | Lim et al. | 348/222.1 |
| 2009/0060375 A1 * | 3/2009 | Lim et al. | 382/266 |

* cited by examiner

Primary Examiner — John Strege

(57) ABSTRACT

A method for detecting edges includes calculating a gradient level value for each pixel of a digital image and assigning each pixel to one of a plurality of gradient bins based on the calculated gradient level value for each pixel, the gradient bins being defined by threshold levels. One or more of the gradient bins are assigned as edge bins, and one or more of the gradient bins are assigned as non-edge bins according to the number of pixels assigned to each gradient bin. Pixels in the one or more edge bins are identified as edge pixels, and pixels in the one or more non-edge bins are identified as non-edge pixels in an edge map. The one or more gradient bins are assigned such that a minimum number of pixels are identified as edge pixels and no more than a maximum number of pixels are identified as edge pixels.

20 Claims, 13 Drawing Sheets

|  | BIN 0 | BIN 1 | BIN 2 | BIN 3 | APPLIED THRESHOLD |
|---|---|---|---|---|---|
| COUNT(BIN 0) >= X | NON-EDGE BIN | EDGE BIN | EDGE BIN | EDGE BIN | TH0 |
| COUNT(BIN 0) < X AND COUNT(BIN 3) >= Y | NON-EDGE BIN | NON-EDGE BIN | NON-EDGE BIN | EDGE BIN | TH2 |
| COUNT(BIN 0) < X AND COUNT(BIN 3) < Y | NON-EDGE BIN | NON-EDGE BIN | EDGE BIN | EDGE BIN | TH1 |

BIN ASSIGNER

*Fig. 10*

ADAPTIVE EDGE MAP THRESHOLD

CROSS-REFERENCE TO RELATED APPLICATIONS

This application claims priority from U.S. Provisional Patent Application No. 61/079,266, filed on Jul. 9, 2008, and entitled "Adaptive Edge Map Threshold," the entirety of which is incorporated herein by reference.

This application is also related to U.S. Non-Provisional patent application Ser. No. 12/400,207, filed on Mar. 9, 2009, and entitled "Filter Bank Based Phase Correlation Architecture For Motion Estimation," Ser. No. 12/440,220, filed on Mar. 9, 2009, and entitled "Picture Rate Conversion System For High Definition Video," and Ser. No. 12/400,227, filed on Mar. 9, 2009, and entitled "Picture Rate Conversion System Architecture," the entirety of each of which is incorporated herein by reference.

FIELD

The technology described in this patent document relates generally to video processing and more particularly to digital video edge detection.

BACKGROUND

Edge detection is a technique in image processing that identifies points in a digital image at which image brightness changes sharply or has discontinuities. Detecting sharp changes in image brightness is often desirable to capture important events and properties in the depicted image. Discontinuities in image brightness often correspond with object edges, discontinuities in depth, discontinuities in surface orientation, changes in material properties, variations in scene illumination, etc.

In an ideal scenario, applying an edge detector to an image identifies a set of connected curves that indicate boundaries of objects, boundaries of surface markings, and curves that correspond to discontinuities in surface orientation. Applying an edge detector to an image may significantly reduce the amount of data to be processed downstream by filtering information that may be regarded as less relevant, while preserving the important structural properties of an image. While quality edge detection may substantially simplify and enhance downstream image processing, edge detection in non-trivial images is often hampered by fragmentation, false edges, and other limitations that may mitigate the described benefits.

FIG. 1 is a digital photograph of a bicycle chained to a bicycle rack. The photograph depicts all features of a normal photograph including textures and shading. FIG. 2 is a depiction of the digital photograph of FIG. 1 following conventional edge detection processing. The image has been simplified, removing many less important details, to only depict the structural framework of the photograph. During processing, each pixel of the photograph is compared to surrounding pixels and is given a score identifying the likelihood that the pixel is an edge pixel. FIG. 2 is a visualization of these edge-likelihood scores, where brighter pixels correspond to pixels of the photograph that are deemed likely to correspond to edges in the photograph.

FIG. 3 depicts a block diagram for a system for generating an edge map for a digital image. A digital image 52 is received by an edge detector 54. The edge detector 54 processes the image using any of a number of known edge detecting techniques to generate an edge map 56. The edge map 56 may be generated in a variety of forms including storage of edge-likelihood scores for each pixel of the digital image 52 or an on-off representation where each pixel is associated with a '1' or '0' value identifying whether the pixel has been deemed an edge pixel by the edge detector. Example edge detection techniques include the Canny, Canny-Deriche, differential, and Sobel techniques.

FIG. 4 depicts a block diagram of a conventional edge detector for generating an edge map in conjunction with a gradient threshold comparator. A digital image 62 is received by an edge detector 64 for generation of an edge map 66. The received digital image 62 is propagated to each of four filters: a horizontal filter 68, a vertical filter 70, a principal diagonal filter 72, and an off diagonal filter 74. Each of the filters measures the gradient, or rate of change, of pixel brightness in comparison to surrounding pixels in the filter's specified direction for each pixel and outputs a directional gradient value. These values are received from the filters and are added together at 76 to generate a gradient score for a pixel. In the configuration of FIG. 4, the pixel gradient score is received by a comparator 78 and measured against a gradient threshold 80. If the gradient score is greater than the gradient threshold 80, then the pixel is identified as being an edge pixel in the edge map 66.

FIG. 5 depicts a plot of pixels against gradient level value scores. The depicted data 102 shows the number of pixels in the input digital image that are assigned each gradient level value score. A gradient threshold value is depicted at 104. All pixels that appear to the right of the gradient threshold value line 104 are deemed edge pixels, while all pixels to the left of the line 104 are deemed non-edge pixels.

SUMMARY

In accordance with the teachings provided herein, systems and methods are provided for detecting edges. The systems and methods may include calculating a gradient level value for each pixel of a digital image and assigning each pixel to one of a plurality of gradient bins based on the calculated gradient level value for each pixel, the gradient bins being defined by a plurality of threshold levels. One or more of the gradient bins may be assigned as edge bins, and one or more of the gradient bins may be assigned as non-edge bins according to the number of pixels assigned to each gradient bin. Pixels in the one or more edge bins may be identified as edge pixels, and pixels in the one or more non-edge bins may be identified as non-edge pixels in an edge map. The one or more gradient bins may be assigned such that a minimum number of pixels are identified as edge pixels and no more than a maximum number of pixels are identified as edge pixels.

As another example, a system and method of generating a motion vector describing motion of a pixel from a previous frame to a current frame may include decomposing received previous frame data and current frame data into a high pass component and a low pass component, the high pass component corresponding to small object motion, the low pass component corresponding to large object motion. The decomposing may include performing an edge detection on pixels of the previous frame or the current frame. The edge detection may include calculating a gradient level value for each pixel, and assigning each pixel to one of a plurality of gradient bins based on the calculated gradient level value for each pixel, where the gradient bins are defined by a plurality of threshold values. One or more of the gradient bins may be assigned as edge bins, and one or more of the gradient bins may be assigned as non-edge bins according to the number of pixels assigned to each gradient bin. Pixels in the one or more edge bins may be identified as edge pixels, and pixels in the one or more non-edge bins may be identified as non-edge pixels in an edge map. The one or more gradient bins may be assigned such that a minimum number of pixels are identified as edge pixels and no more than a maximum number of pixels are identified as edge pixels. A low pass motion vector may be calculated based on the low pass component and a high pass component motion vector based on the high pass component. A selection between the low pass motion vector and the high pass motion vector may be made based in part on whether the pixel is identified as an edge pixel.

As a further example, a system may include an edge detector for detecting edges in a video frame. The edge detector may include a gradient level value calculator to calculate a gradient level value for each pixel of the digital video frame. The system may further include a plurality of gradient bins configured to store pixels assigned to particular gradient bins based on the calculated gradient level value for each pixel, the gradient bins being defined by a plurality of threshold values, and a bin assigner configured to assign one or more of the gradient bins as edge bins and one or more of the gradient bins as non-edge bins according to the number of pixels assigned to each gradient bin, the bin assigner assigning bins such that a minimum number of pixels are contained in edge bins and no more than a maximum number of pixels are contained in non-edge bins. The system may also include an edge pixel identifier configured to identify pixels in the one or more edge bins as edge pixels and to identify pixels in the one or more non-edge bins as non-edge pixels.

BRIEF DESCRIPTION OF THE DRAWINGS

FIG. 10 depicts a chart describing the logic utilized by an example bin assigner in identifying gradient bins as edge bins and non-edge bins.

DETAILED DESCRIPTION

Figure 1:
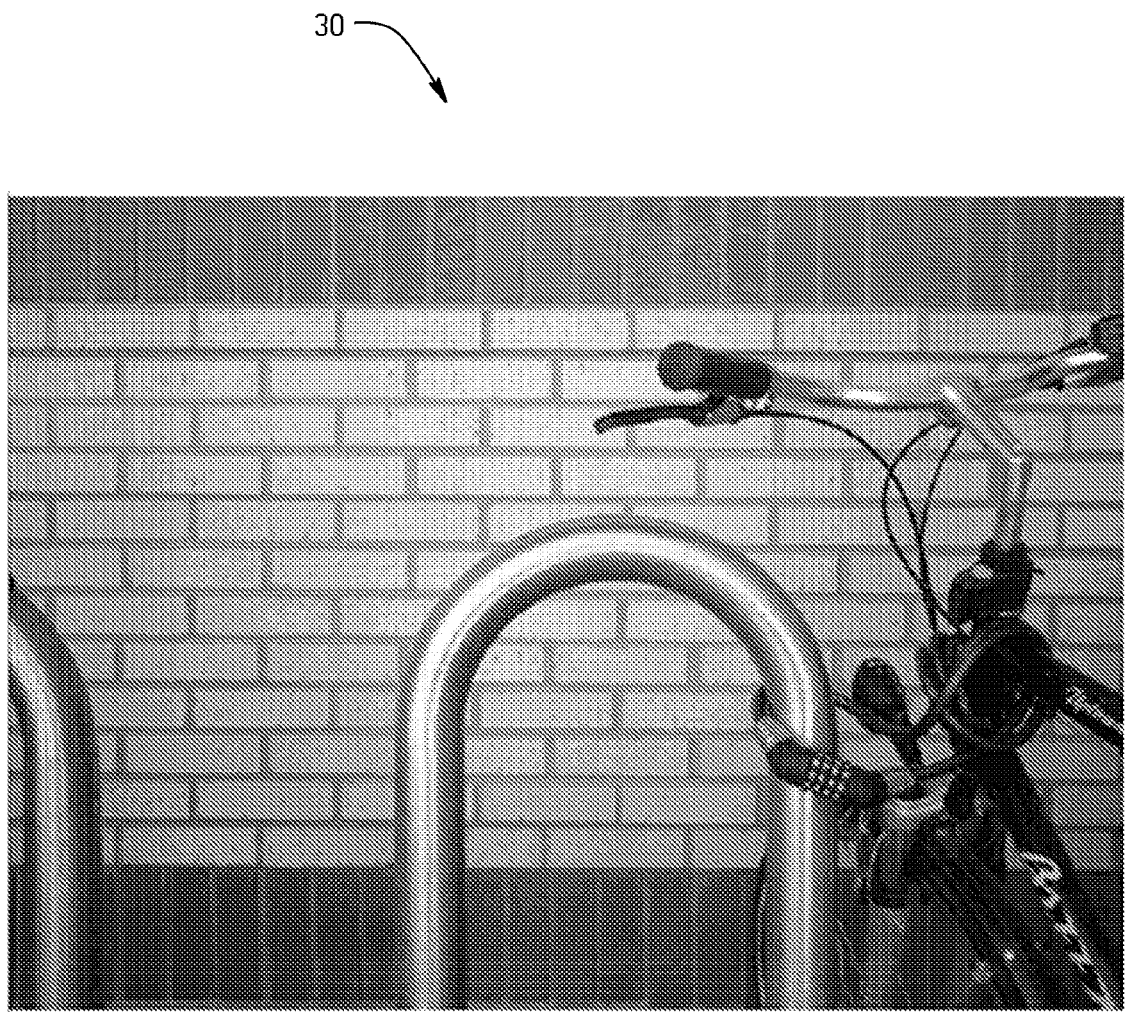
FIG. 1 is a digital photograph of a bicycle chained to a bicycle rack.
Figure 2:
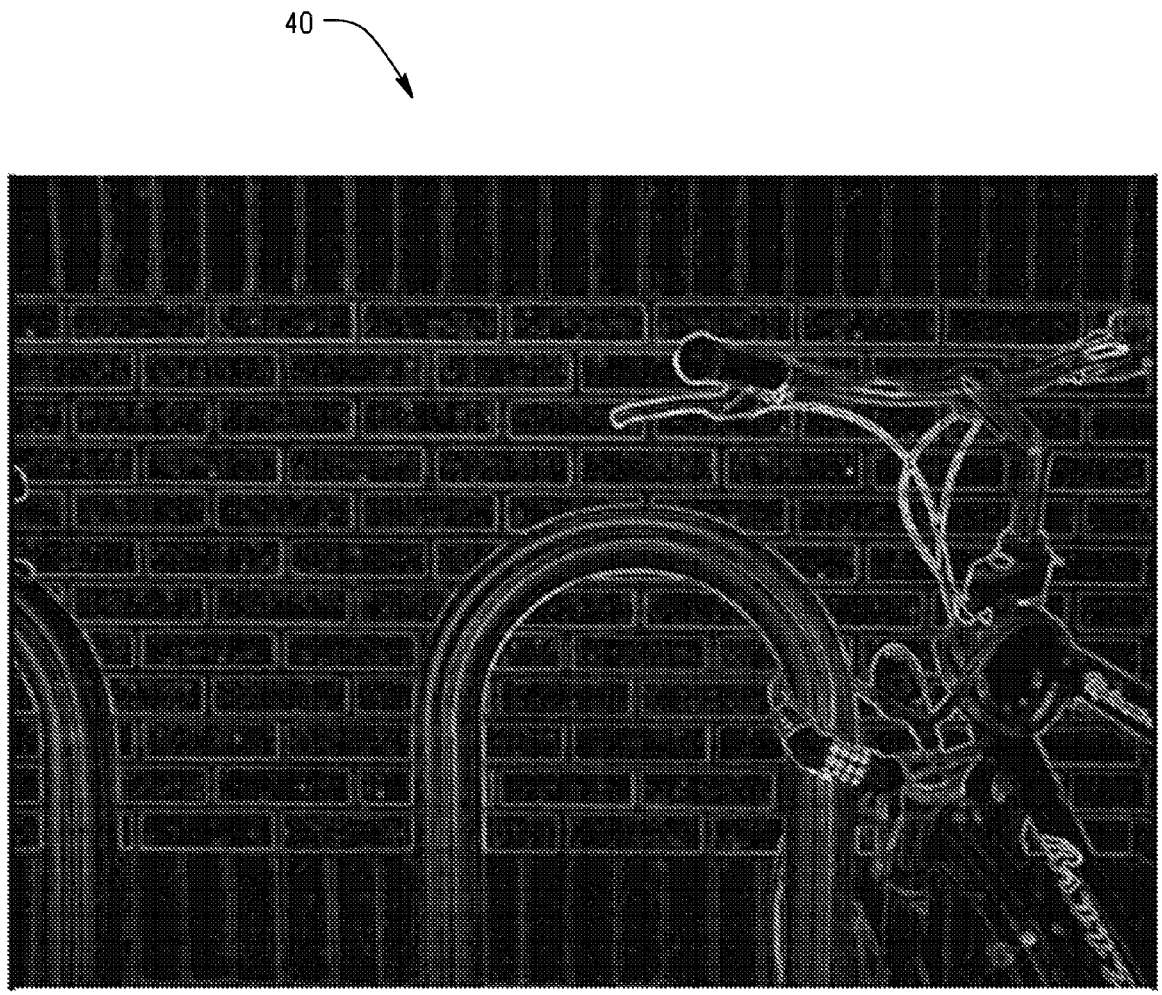
FIG. 2 is a depiction of a digital photograph following edge detection processing.
Figure 3:
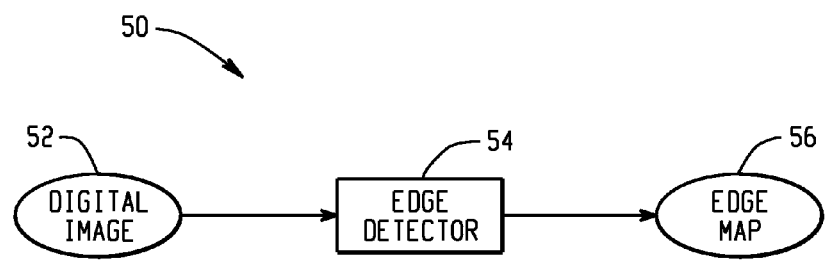
FIG. 3 depicts a block diagram of a system for generating an edge map for a digital image.
Figure 4:
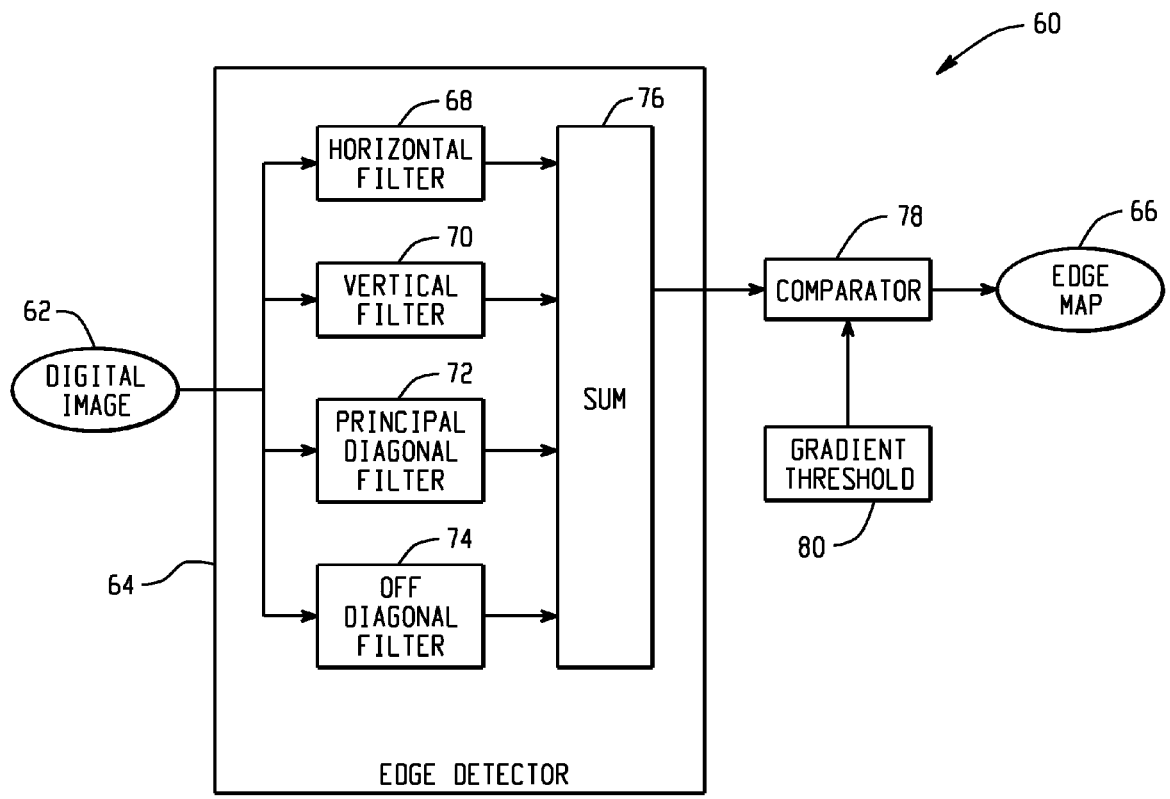
FIG. 4 depicts a block diagram of an edge detector for generating an edge map in conjunction with a gradient threshold comparator.
Figure 5:
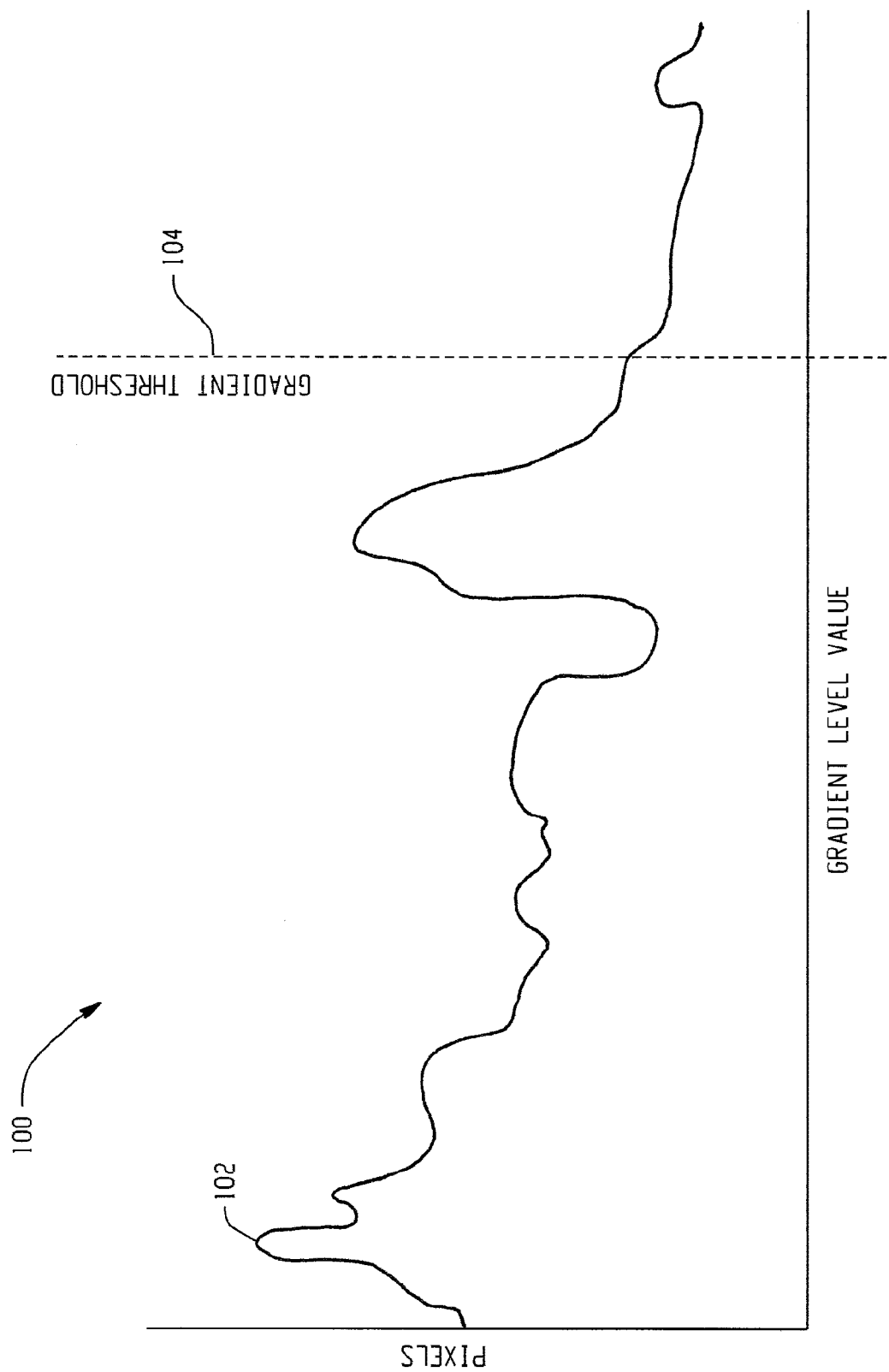
FIG. 5 depicts a plot of pixels against gradient level value scores.

Edge detection in a digital image is often a non-trivial task requiring large processing time and/or a high degree of user intervention to ensure high quality results. For example, the selection of the gradient threshold value described with reference to FIG. 5 may play a large role in the quality of the edge detecting operation. Proper gradient threshold setting is often image dependent. In images depicting large objects with constant colors and textures, a low gradient threshold may be desirable to fully capture even faint edge portions. However, in busier images having complicated textures and noise, a very high gradient threshold may be required to discern meaningful edge data from false positives.

Figure 6A:
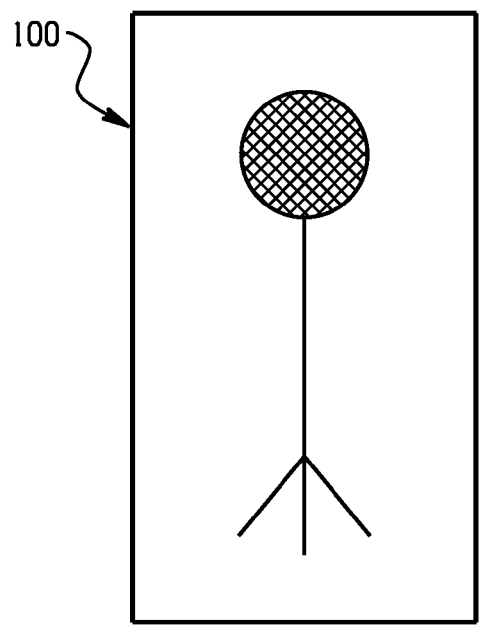
FIGS. 6A-6D depict operational scenarios resulting from different gradient threshold value settings.
Figure 6B:
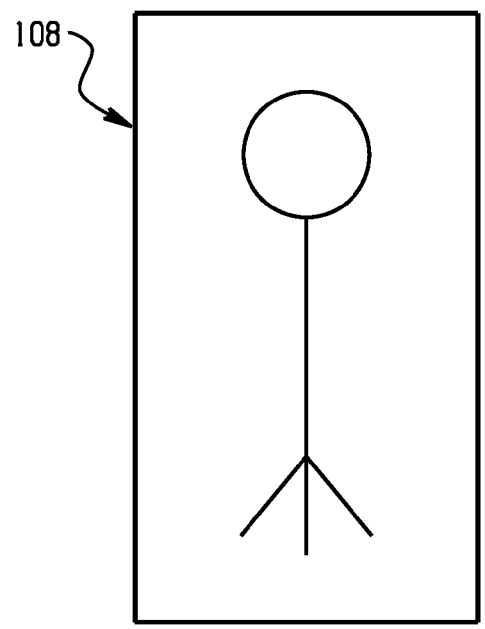
Figure 6C:
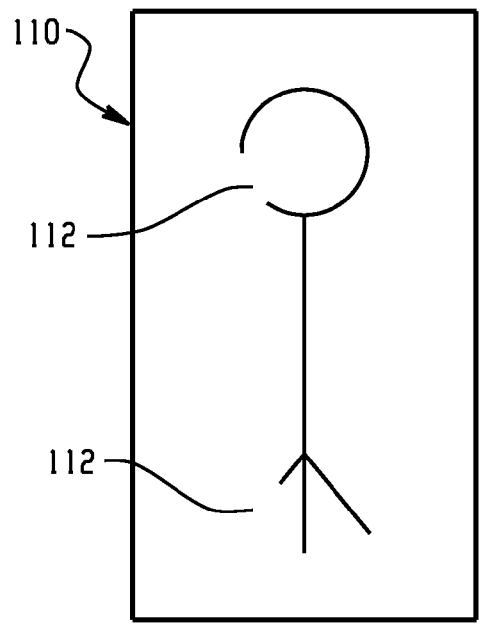
Figure 6D:
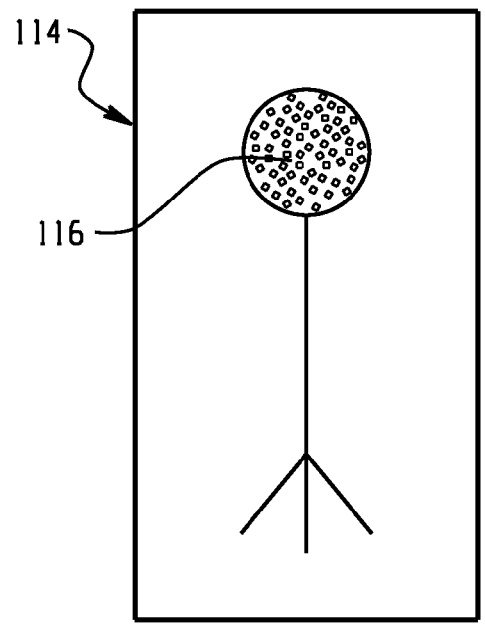

FIGS. 6A-6D depict operational scenarios resulting from different gradient threshold value settings. FIG. 6A depicts an example input image 106. The input image 106 includes a solid ball connected to a vertical line that terminates in three branches. FIG. 6B depicts a high quality edge detection 108 depicting the structural edges of the input image 106 resulting from a proper gradient threshold value. The high quality edge map depicted in FIG. 6B includes only the outline of the solid ball as well as all of the connected lines. FIG. 6C depicts a lesser quality edge detection 110. The lower quality, causing missing edge portions 112 of the ball and connected lines, may have been caused by a too-high gradient threshold setting. A gradient threshold being set too high may result in some pixels that should have been categorized as edge pixels being identified as non-edge pixels as shown in FIG. 6C at 112. FIG. 6D depicts a second lesser quality edge detection 114. The lower quality in FIG. 6D is caused by a gradient threshold being set too low, such that some pixels 116 within the solid ball, which are not edges, are identified as edges by an edge detector.

The edge detection deficiencies caused by incorrect gradient threshold setting described above may often be rectifiable when dealing with individual digital images. Threshold values may be adjusted by a user, and the edge detection processes may be re-run to achieve better results. However, such a solution is not feasible or effective in many situations. For example, in digital video processing, upwards of 60 or 120 digital video frames may need to be processed for a single second of video. This high-speed processing requirement eliminates manual threshold adjustment as an option and may further exclude complex computer processing techniques that attempt to calculate an optimum threshold from being effectively implemented.

Figure 7:
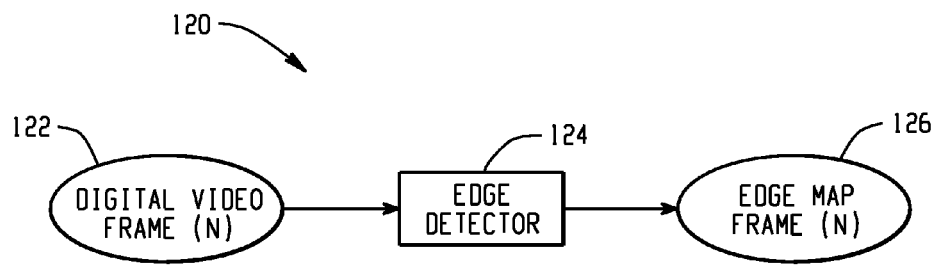
FIG. 7 depicts a block diagram of an edge detection scenario for digital video.

FIG. 7 depicts a block diagram of an edge detection scenario for digital video. Digital video frames 122 are received by an edge detector 124 where an edge map 126 for each of the N video frames is generated. Rapid processing requirements in such a scenario may exclude manual gradient threshold setting and complex computer-algorithm threshold setting techniques as viable options.

As noted above, prior edge detection solutions utilize a programmable gradient threshold that is applied throughout an image. This often generates less than desirable results when processing changing images that require fast sequential processing. For many image processing techniques that utilize edge detector outputs, registration of a range of edge pixels in a video frame tends to offer best results. In other words, for each frame of a digital video, it is often beneficial to register at least a minimum number or percentage of edge pixels (X) and no more than about a maximum number or percentage of edge pixels (Y). This result is often not achieved through use of a constant gradient threshold.

To achieve these desired results, dynamic threshold setting systems are described below that adaptively adjust gradient threshold settings to address properties specific to a video scene. Because changes between frames within a common scene are relatively minor when compared to changes between unrelated digital images, gradient threshold values may be adjusted from initial threshold settings throughout a scene to improve edge detection results. Additionally, the described systems may utilize a binning technique that fulfills the minimum/maximum edge pixel requirements in a high speed manner that is conducive to digital video processing.

Figure 8:
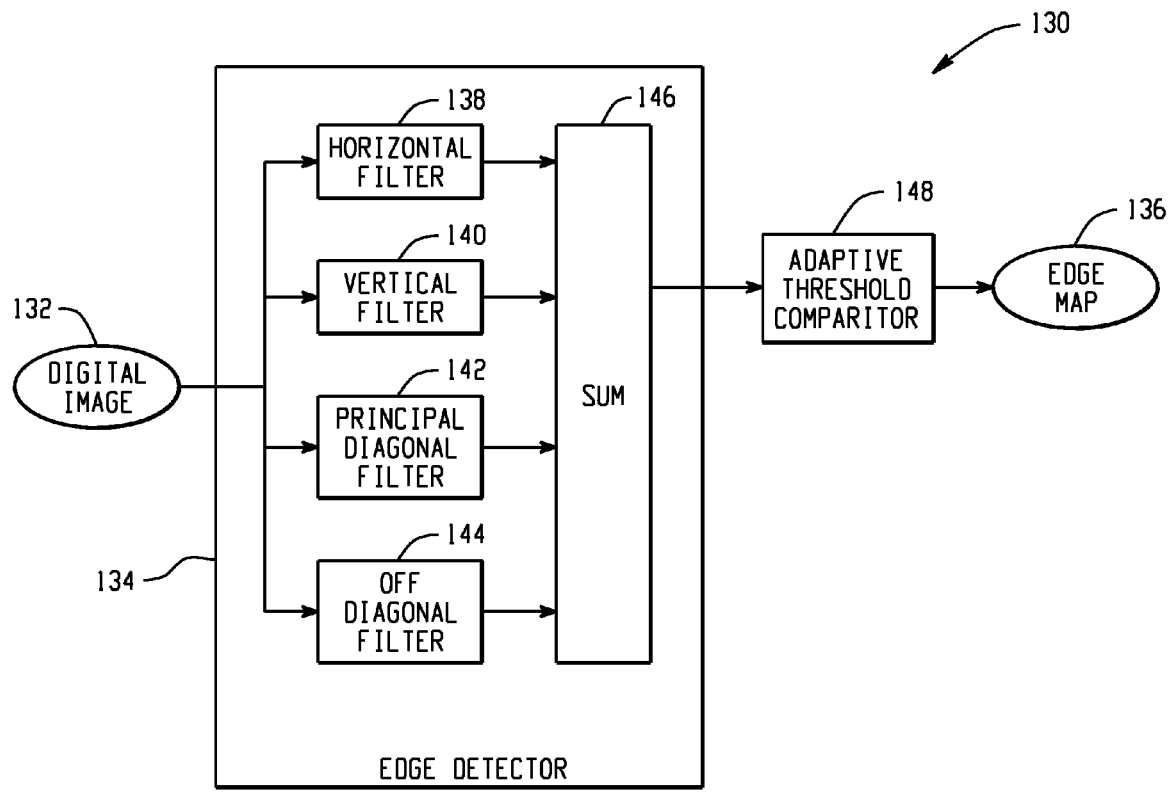
FIG. 8 depicts a block diagram of an adaptive threshold comparator responsive to an edge detector.

FIG. 8 depicts a block diagram of an adaptive threshold comparator responsive to an edge detector. A digital image or video 132 is received and propagated to an edge detector 134 for generation of an edge map 136. The digital image 132 is provided to each of four filters 138, 140, 142, 144, which calculate a pixel brightness rate of change (gradient score) for individual pixels when compared to surrounding pixels in the filter's assigned direction. Each of the filters 138, 140, 142, 144 outputs a gradient score which is summed at 146 and output from the edge detector 134 as a gradient level value. The gradient level value for a pixel is received by an adaptive threshold comparator 148, which makes a determination as to whether the pixel is an edge pixel or a non-edge pixel and outputs the determination to the edge map 136.

Figure 9:
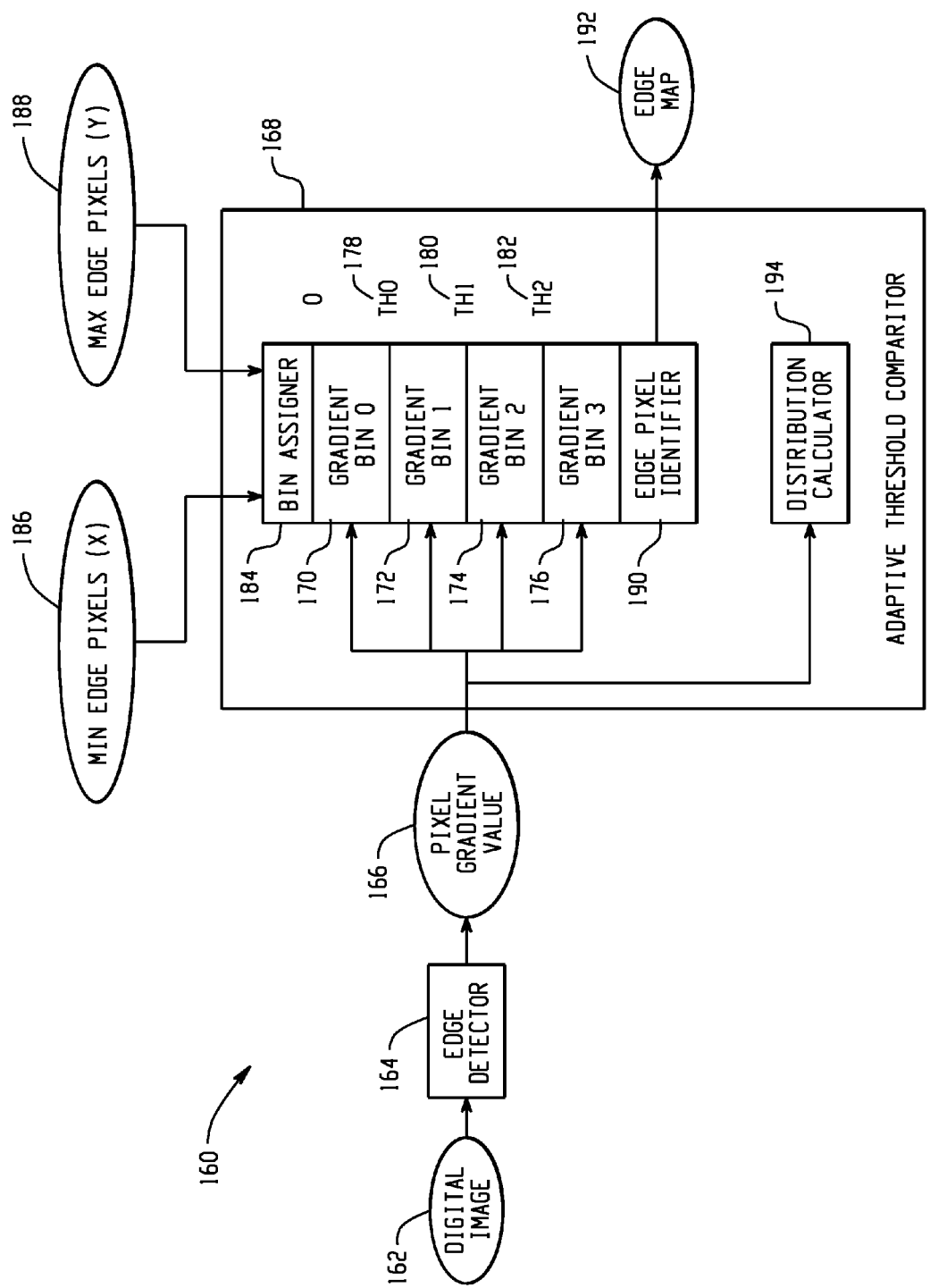
FIG. 9 depicts a block diagram of an edge detector system depicting internal components of an adaptive threshold comparator.

FIG. 9 depicts a block diagram of an edge detector system depicting internal components of an adaptive threshold comparator. A digital image 162 is received by an edge detector 164 that calculates gradient level value scores 166 for each pixel of the digital image 162. The pixel gradient values are received by an adaptive threshold comparator 168 which classifies the incoming pixel into one of four gradient bins 170, 172, 174, 176 according to the gradient level value 166 associated with the pixel. In a four bin implementation, a pixel's bin assignment may be represented as a two-bit value associated with the pixel. The bins are each defined by threshold values. For example, gradient bin 0 (170) is defined by gradient level values less than an upper threshold value, TH0 178. Gradient bin 1 (172) is defined by TH0 178 and an upper threshold value, TH1 180. Gradient bin 2 (174) is defined by TH1 180 and an upper threshold value, TH2 182, and gradient bin 3 (176) holds pixels having a gradient level value score 166 greater than TH2 182.

A bin assigner 184 receives parameters indicating the minimum number of pixels of a frame or portion of a frame to be assigned edge pixel status (X) 186 as well as a maximum number of edge pixels to be defined as edge pixels (Y) 188. The bin assigner 184 counts the number of pixels assigned to each of the gradient bins 170, 172, 174, 176 for a given frame or portion of a frame and assigns each of the gradient bins as either an edge bin or a non-edge bin in order to best meet the minimum/maximum edge pixel requirements 186, 188. The edge pixel identifier 190 identifies pixels in the one or more edge bins as edge pixels and the pixels in the one or more non-edge bins as non-edge pixels and outputs these designations to an output edge map 192. This designation of a pixel as an edge pixel or a non-edge pixel effectively collapses the two-bit gradient bin designation of a pixel to a one-bit edge map. A distribution calculator 194 receives the gradient level value scores 166 for each pixel in a frame or portion of a frame and adjust the threshold values 178, 180, 182 accordingly in preparation for the next frame or similar portion of a frame processed by the edge detector 164.

FIG. 10 depicts a chart describing example logic utilized by an example bin assigner in identifying gradient bins as edge bins and non-edge bins. During or following pixel binning, the bin assigner counts the number of pixels placed in gradient bin 0 and gradient bin 3 and compares the count values to the minimum edge pixel value X and the maximum edge pixel value Y. As shown in the chart, the pixels in gradient bin 0 are always identified as non-edge pixels, and the pixels in gradient bin 3 are always classed as edge pixels. This helps to ensure that at least some pixels will be edge pixels and some pixels will be non-edge pixels, as an edge map identifying all pixels as either edges or non-edges has little utility. In the unlikely event that all pixels of an image or image portion are placed into bins such that all pixels are classed as one type, implementation of the adaptive threshold setting features described herein may alleviate this condition for future frames where static thresholds could not.

As illustrated on the first row of bin assigner chart, if the count in bin 0, later referred to as A, is greater than the minimum number of edge pixels parameter, X, then the pixel distribution is low gradient level value heavy, and gradient bins 1, 2, and 3 are assigned as edge bins. In this scenario, the effective gradient threshold is TH0. In contrast, the second row of the chart depicts directions for scenarios where the count of pixels in bin 0 is less than X and the count of pixels in bin 3, later referred to as D, is greater than or equal to the maximum number of edge pixels parameter, Y. In such a scenario, the applied gradient threshold is TH2. This scenario identifies a very high gradient level value distribution, and only bin 3 is assigned as an edge bin. A finding that the count in bin 0 is less than X, and the count in bin 3 is less than Y identifies a balanced gradient level value distribution, and bins 0 and 1 are assigned as non-edge bins, and bins 2 and 3 are assigned as edge bins, effectively applying TH1 as the gradient threshold.

Figure 11:
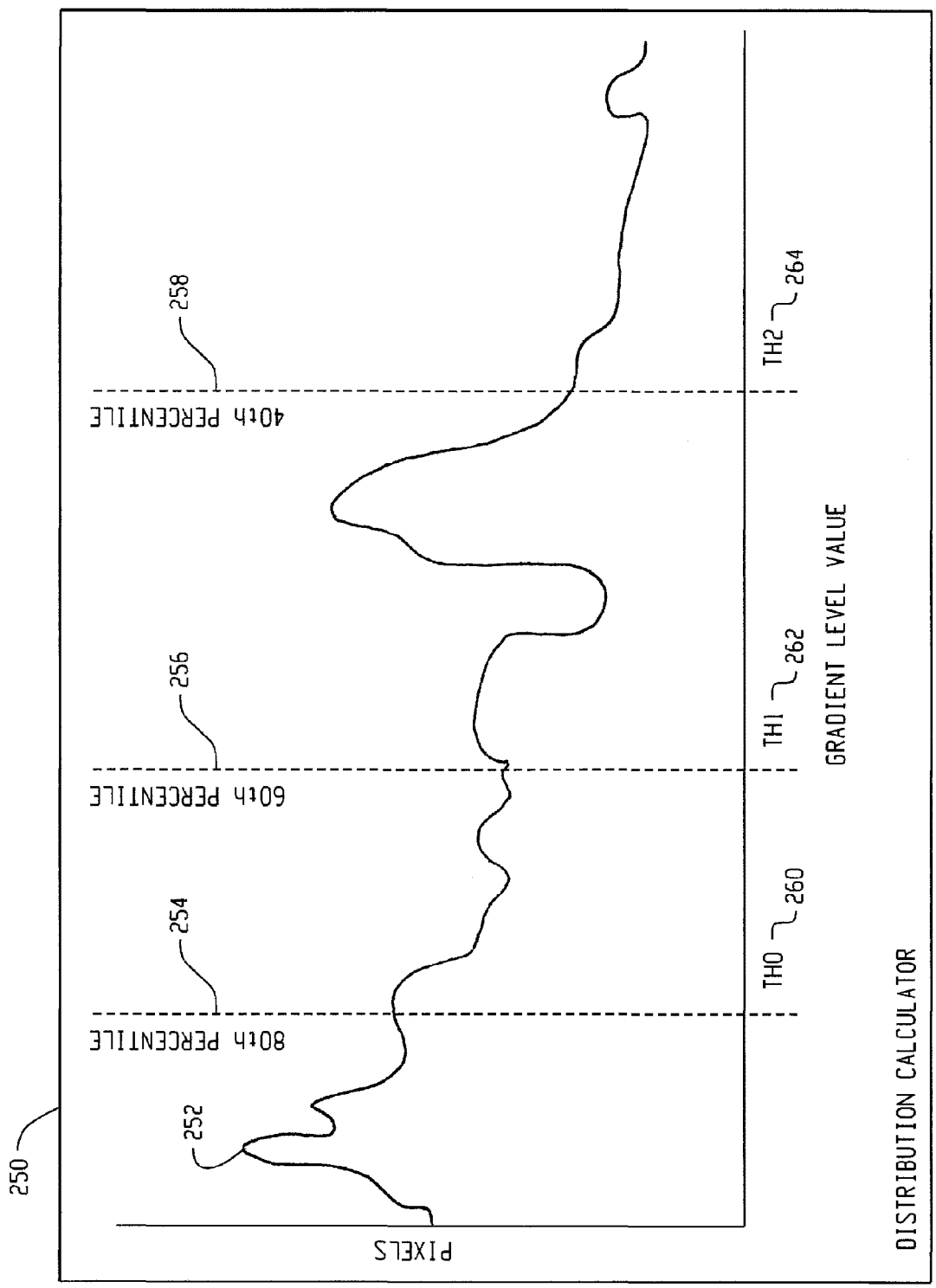
FIG. 11 further depicts operations of a distribution calculator.

FIG. 11 further depicts operations of a distribution calculator. As noted above, the distribution calculator 250 receives the gradient level value scores for each of the pixels in a digital image, video frame, or portion thereof. The distribution calculator calculates a distribution of the gradient level value scores across the population of pixels and identifies certain user or otherwise defined percentile points in the distribution for threshold score, such as TH0, TH1, and TH2, adjustment. Such a distribution and identification may, for example, be calculated utilizing a sorted list where certain array positions in the sorted list of gradient level values are identified as percentile positions. FIG. 11 depicts a visualization of this process where a distribution of gradient level values 252 across a population of pixels is plotted. The $80^{th}$ (254), $60^{th}$ (256), and $40^{th}$ (258) percentiles are noted, and corresponding thresholds TH0 260, TH1 262, and TH2 264 are set for use in edge detection in later frames.

Figure 12:
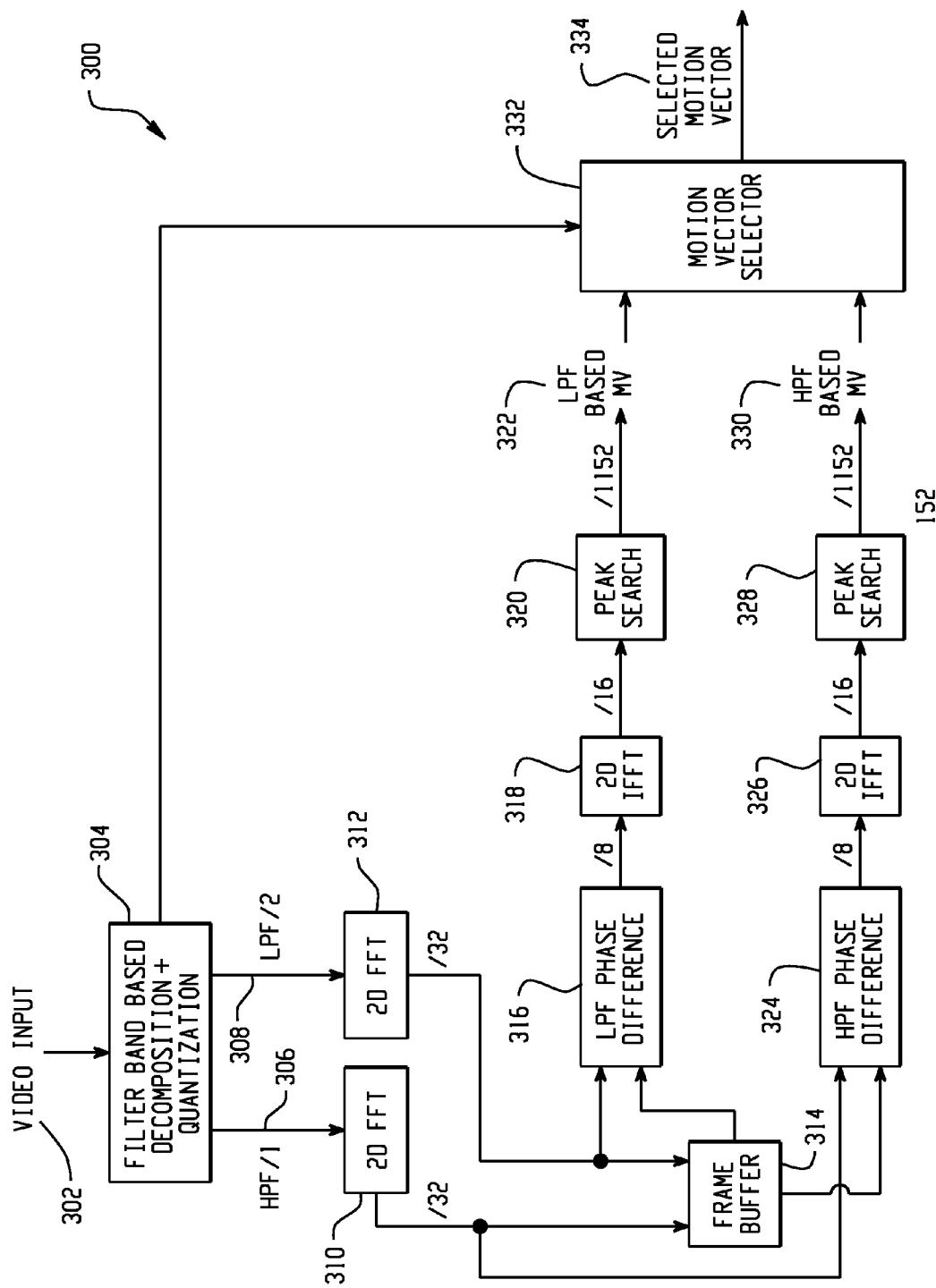

FIG. 12 illustrates an example implementation where the described edge detection and dynamic threshold techniques may be utilized. FIG. 12 is a flow diagram illustrating a phase plane correlation calculator 300 for generating motion vector candidates for use in frame rate conversion. A cost effective design of a phase correlation based motion estimator has been a historically difficult problem. One problem in phase correlation based design is the effective and practical design of the two fast Fourier transform mechanisms. Block sizes that are able to yield acceptable motion vectors for video resolutions up to full HD involve at least 64×32 pixels. The line buffers needed for video frames of this size tend to be prohibitively expensive. Also, the ability to process up to and over 1920× 1080 pixels at a 60 Hz temporal rate involves immense parallelism that puts a very large strain on memory bandwidth and other hardware requirements.

The use of the above described edge detection systems and techniques enables a reduction in the complexity of the Fourier transform for the phase correlation through reduction of the line buffer requirement by quantization of the input pixels following decomposing the them into low pass and high pass information. The use of the low pass and high pass filtered signal for the motion estimation enables flexibility to track both macro details through the low pass filter output and micro details via the high pass filter output. The function of the phase plane correlation calculator depicted in FIG. 12 is herein described.

The phase plane correlation calculator 300 calculates the motion between two frames using the Fourier shift theorem. The Fourier shift theorem states that two signals shifted by a uniform translation are phase shifted when represented in the frequency-domain. Thus, by taking the Fourier transform of two images that are shifted by a given translation, the Fourier representation of the signal is shifted by a phase shift that is proportional to the translation. The inverse Fourier transform of the phase shift generates a phase correlation surface where the position of the peaks in the surface represents the magnitude of the shift, and the height of the peaks represents the reliability of the estimated motion vectors. The maximum translation that a phase plane correlation calculator is capable of detecting is based on the size of the Fourier transform. An N point horizontal by M point vertical Fourier transform can measure the maximum shift of +/−N/2 horizontal and +/−M/2 vertical. The typical motion range for a 1080p resolution signal may require a Fourier transform of 64×32 pixels or more.

When block sizes becomes large, the reliability of the estimated motion vectors may decrease. Thus, it is often possible to miss small object motion because small objects do not make large contributions to the correlation surface and are masked by noise in the image. To circumvent this problem, a filter bank based design may be utilized. Filtering the input signal into low pass representations and high pass representations aides in identifying both large and small object motion within a video frame. Typical motion compensation converters are unable to account for such multiple object movement within a video frame. Thus, incorrect motion vectors may be calculated where multiple objects are moving at the same time, such as in a sports video where players may appear as large objects on the screen moving in one direction while a small ball may also be depicted moving in a different direction or at a different speed. By decomposing input signals into both low pass and high pass representations, both small and large object motion may be better accounted for and more optimal motion compensation may be accomplished. The low pass filtered image captures the global motion or large object motion in the block, and the high pass filtered image captures the small object motion. Because these two motion engines are independent of each other, the problem of failing to compensate for small object motion may be addressed.

The process for generating motion vectors of FIG. 12 begins with the receipt of previous frame data and current frame data 302 for a block at a filter band based decomposition and quantization unit 304. In the filter band based decomposition and quantization unit 304, the effect of noise is minimized by quantization of the signal, such as through use of the adaptive edge detection systems and methods described above. The previous frame data and current frame data are decomposed into high pass 306 and low pass 308 representations via a high pass filter and a low pass filter resulting in a low pass previous frame representation ($F_1(x_1,y_1)$), a low pass current frame representation ($F_2(x_2,y_2)$), a high pass previous frame representation ($F_3(x_3,y_3)$), and a high pass current frame representation ($F_4(x_4,y_4)$).

Following decomposition, each of the representations are processed by one or more two-dimensional fast Fourier transform calculators (FFTs) 310, 312. The two-dimensional FFTs 310, 312 take the time-domain representations output by the filter band based decomposition and quantization block 304 and convert the representations into frequency-domain representations: $F_1(\omega_x, \omega_y)$, $F_2(\omega_x, \omega_y)$, $F_3(\omega_x, \omega_y)$, $F_4(\omega_x, \omega_y)$.

Some or all of the frequency-domain representations may be temporarily stored in a frame buffer 314 before proceeding with further calculation.

Following calculation of the frequency-domain conversions, a phase difference 316 is calculated between the low pass, frequency-domain representations of the previous frame data and the current frame data. For example, the phase difference may be calculated by solving for the "A" and "B" parameters of the following formula:

$$F_2(\omega_x,\omega_y)) = e^{-j(A\omega_x + B\omega_y)} F_1(\omega_x,\omega_y).$$

After calculating the phase difference 316 between the previous frame data and the current frame data, a two-dimensional inverse fast Fourier transform (IFFT) 318 is applied to the calculated phase difference 316. The result of the IFFT 318 calculation is a two-dimensional phase plane correlation surface. The phase plane correlation surface may be viewed as a contour map identifying motion between the previous frame and the current frame of the source video. The locations of peaks on the phase plane correlation surface ($a_1$, $b_1$) correspond to motion within the frame block such that:

$$F_2(x_2,y_2) = F_1(x_2 + n \cdot a_1, y_2 + m \cdot b_1).$$

The height of a peak on the phase correlation surface corresponds to the size of an object that is moving within a block. To locate peaks within the phase correlation surface, a peak search 320 is performed, and based on the identified peaks, a low pass filter based motion vector 322 is determined. The low pass filter based motion vector corresponds to large object motion within a frame block.

A similar process is performed utilizing the high pass frequency-domain representations ($F_3(\omega_x, \omega_y)$, $F_4(\omega_x, \omega_3)$) calculated by the two-dimensional FFT 310. Again, some or all of the high pass frequency-domain representations may be temporarily stored in a frame buffer 314. Following calculation of the high pass frequency-domain representations, a phase difference 324 is calculated between the high pass, frequency-domain representations of the previous frame data and the current frame data. For example, the phase difference 324 may be calculated by solving for the "C" and "D" parameters of the following formula:

$$F_4(\omega_x,\omega_y) = e^{-j(A\omega_x + B\omega_y)} F_3(\omega_x,\omega_y).$$

After calculating the phase difference 324 between the previous frame data and the current frame data, a two-dimensional IFFT 326 is applied to the calculated phase difference 324. The result of the IFFT calculation 326 may be viewed as a second two-dimensional phase plane correlation surface. The locations of peaks on the second phase plane correlation surface ($c_1$, $d_1$) correspond to motion within the frame block such that:

$$F_4(x_4,y_4) = F_3(x_4 + n \cdot c_1, y_4 + m \cdot d_1).$$

To locate peaks within the second phase correlation surface, a peak search 328 is performed, and based on the identified peaks, a high pass filter based motion vector 330 is determined. The high pass filter based motion vector 328 corresponds to small object motion within a frame block.

The generated low pass filter based motion vector 322 and high pass filter based motion vector 330 may be received along with other candidate motion vectors by a motion vector selector 332. The motion vector selector also receives data related to whether or not a pixel is identified as an edge pixel from the filter band based decomposition and quantization block 304. Based at least in part on this data a selected motion vector 334 is selected for use in frame rate conversion. For example, a high pass filter based motion vector 328 corresponding to small object motion may more often be selected for use with pixels identified as edge pixels.

Figure 13:
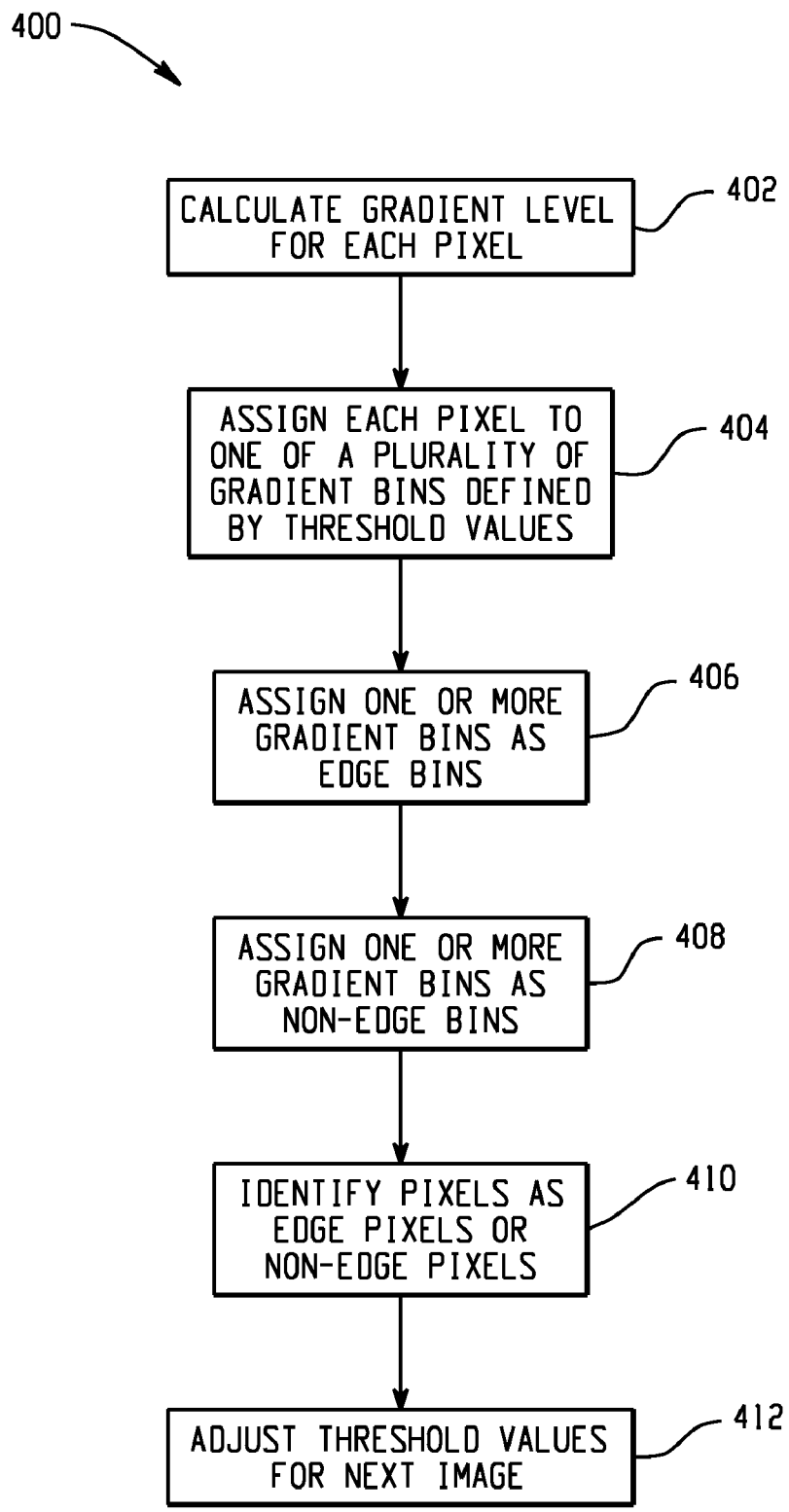
FIG. 13 depicts a flow diagram of a method of detecting edges in a digital image.

FIG. 13 depicts a flow diagram of a method of detecting edges in a digital image. At 402, a gradient level value is calculated for each pixel of the digital image. Each pixel is assigned to one of a plurality of gradient bins defined by a plurality of threshold values at 404 based on the calculated gradient level value for each pixel. At 406, one or more of the gradient bins are assigned as edge bins, and at 408, one or more of the gradient bins are assigned as non-edge bins according to the number of pixels assigned to each gradient bins such that a minimum number of pixels are identified as edge pixels and no more than a maximum number of pixels are identified as edge pixels. At 410, pixels in the one or more edge bins are identified as edge pixels and pixels in the one or more non-edge bins are identified as non-edge pixels. At 412, the plurality of threshold values that define the gradient bins are adjusted for detecting edges in a subsequent digital image according to a distribution of the gradient level values for each pixel in the digital image.

Figure 14:
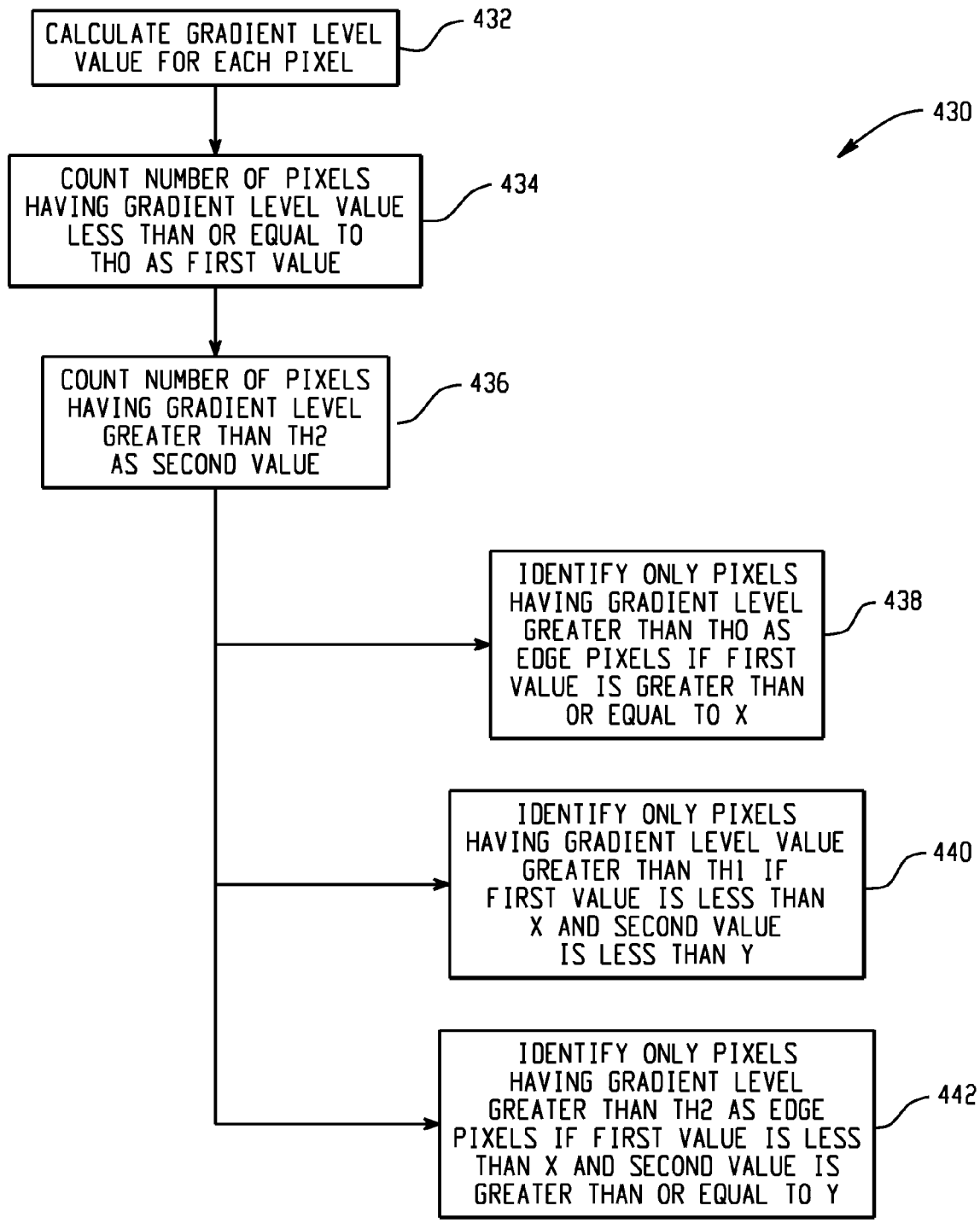
FIG. 14 depicts a flow diagram of a method of detecting edges in a digital image where the method detects at least X edge pixels and no more than Y edge pixels.

FIG. 14 depicts a flow diagram of a method of detecting edges in a digital image where the method detects at least X edge pixels and no more than Y edge pixels. At 432, a gradient level value is calculated for each pixel of the digital image. The number of pixels having a gradient level value less than or equal to a first threshold level, TH0, is counted at 434 as a first value, and the number of pixels having a gradient level value greater than a second threshold level, TH2, is counted at 436 as a second value. All pixels having a gradient level greater than TH0 are identified as edge pixels if the first value is greater than or equal to X, as shown at 438. Only pixels having a gradient level value greater than TH2 are identified as edge pixels if the first value is less than X and the second value is greater than or equal to Y, as shown at 442. Only all pixels having a gradient level value greater than an intermediate threshold value, TH1, are identified as edge pixels if the first value is less than X and the second value is less than Y as shown at 440.

Figure 15:
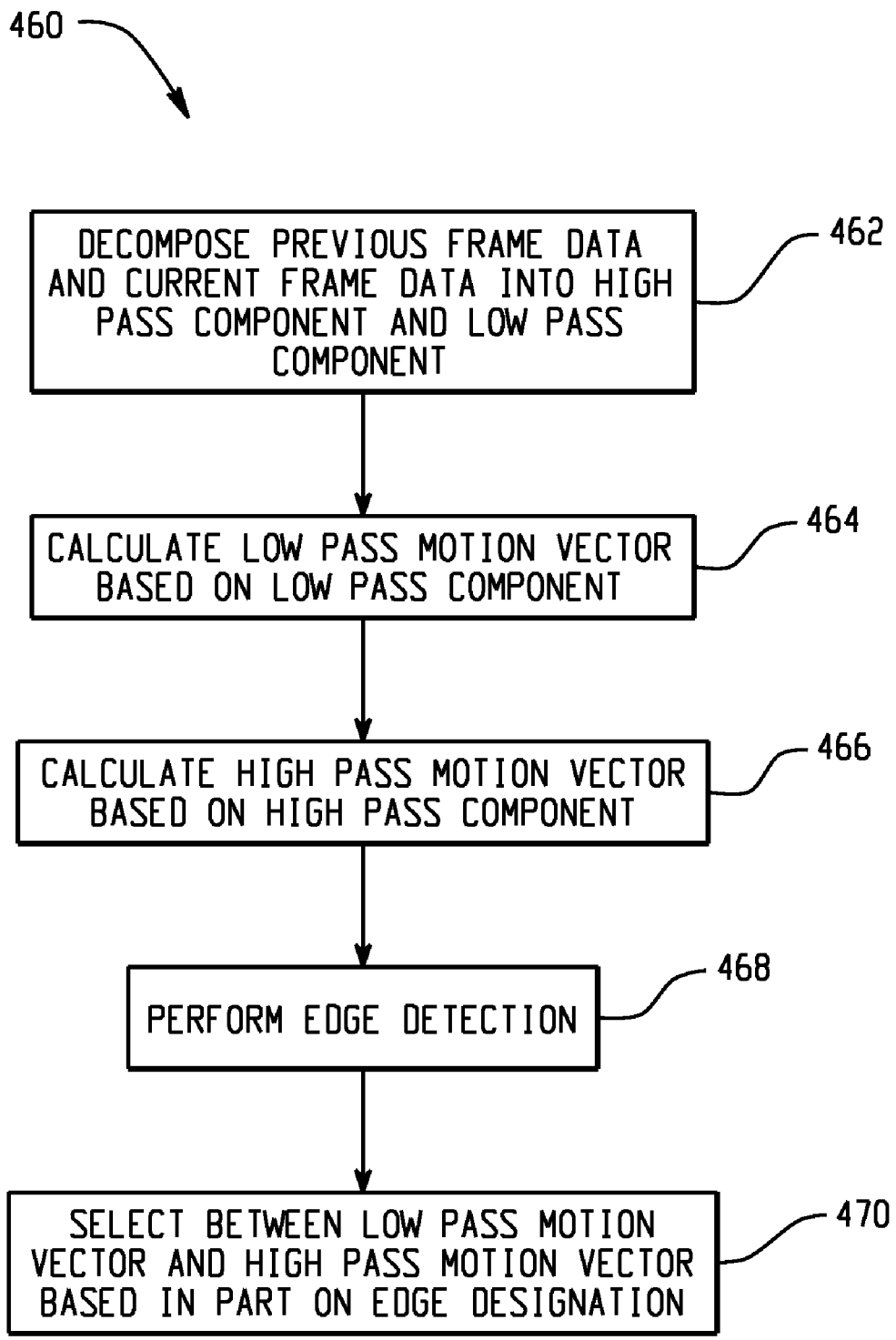
FIG. 15 depicts a flow diagram of a method of generating a motion vector describing motion of a pixel from a previous frame to a current frame.

FIG. 15 depicts a flow diagram of a method of generating a motion vector describing motion of a pixel from a previous frame to a current frame. At 462, received previous frame data and current frame data are decomposed into a high pass component and a low pass component, the high pass component corresponding to small object motion and the low pass component corresponding to large object motion. At 464, a low pass motion vector is calculated based on the low pass component, and at 466, a high pass motion vector is calculated based on the high pass component. An edge detection is performed at 468 and a selection between the low pass motion vector and the high pass motion vector is made at 470 based at least in part on the designation of the pixel as an edge pixel.

This written description uses examples to disclose the invention, including the best mode, and also to enable a person skilled in the art to make and use the invention. It should be noted that the systems and methods described herein may be equally applicable to other configurations. For example, the proposed binning and threshold setting techniques may also be applicable to other image processing procedures such as interest point detection, corner detection, blob detection, ridge detection, feature description, scale space, as well as others. Additionally, the systems and methods may be implemented with larger or smaller numbers of bins than are described in the examples, and may be accomplished without actual physical binning as described with reference to FIG. 14. The system may also include a computer-readable memory configured to store extracted data. The patentable scope of the invention may include other examples that occur to those skilled in the art.

It is claimed:

1. A method of detecting edges, comprising:
   calculating a gradient level value for each pixel of a digital image;
   assigning each pixel to one of a plurality of gradient bins based on the calculated gradient level value for each pixel, the gradient bins being defined by a plurality of threshold values;
   assigning one or more of the gradient bins as edge bins and one or more of the gradient bins as non-edge bins according to the number of pixels assigned to each gradient bin;
   identifying pixels in the one or more edge bins as edge pixels and identifying pixels in the one or more non-edge bins as non-edge pixels in an edge map; and
   the assigning one or more of the gradient bins being configured such that a minimum number of pixels are identified as edge pixels and no more than a maximum number of pixels are identified as edge pixels.

2. The method of claim 1, further comprising adjusting the plurality of threshold values that define the gradient bins for detecting edges in a subsequent digital image according to a distribution of the gradient level values for pixels in the digital image.

3. The method of claim 1, wherein a first number of gradient bins are utilized;
   wherein a first gradient bin is always assigned as an non-edge bin;
   wherein a last gradient bin is always assigned as a edge bin;
   wherein a plurality of gradient bins other than the first gradient bin and the last gradient bin may each be assigned as either an non-edge bin or an edge bin.

4. The method of claim 3, wherein the minimum number of pixels to be identified as edge pixels is represented as X;
   wherein the maximum number of pixels to be identified as edge pixels is represented as Y;
   wherein gradient bins are assigned as edge bins or non-edge bins such that the number of pixels identified as edge pixels is greater than X and less than Y.

5. The method of claim 3, wherein the minimum number of pixels to be identified as edge pixels is represented as X;
   wherein the maximum number of pixels to be identified as edge pixels is represented as Y;
   wherein the first gradient bin is defined by a threshold value, TH0, the first gradient bin containing gradient values (g) defined by $g <= TH0$;
   wherein a second gradient bin is defined by the threshold value, TH0, and a threshold value, TH1, the second gradient bin containing gradient values defined by $TH0 < g <= TH1$;
   wherein a third gradient bin is defined by the threshold value, TH1, and a threshold value, TH2, the third gradient bin containing gradient values defined by $TH1 < g <= TH2$;
   wherein a fourth gradient bin is defined by the threshold value, TH2, and includes all values greater than TH2, the fourth gradient bin containing gradient values defined by $TH2 < g$;
   wherein a value A is a number of pixels in the first gradient bin;
   wherein a value D is a number of pixels in the fourth gradient bin;

wherein only the second gradient bin, the third gradient bin, and the fourth gradient bin are assigned as edge bins if A is greater than or equal to X;

wherein only the fourth gradient bin is assigned as an edge bin if A is less than X and D is greater than or equal to Y;

wherein only the third and fourth gradient bins are assigned as edge bins if A is less than X and D is less than Y.

6. The method of claim 1, further comprising selecting a motion vector for each pixel in part based upon whether the pixel is an edge pixel or a non-edge pixel.

7. The method of claim 6, wherein a motion vector associated with small object motion is selected for a majority of edge pixels.

8. A method generating a motion vector describing motion of a pixel from a previous frame to a current frame comprising:

decomposing received previous frame data and current frame data into a high pass component and a low pass component, the high pass component corresponding to small object motion, the low pass component corresponding to large object motion;

said decomposing including performing an edge detection on pixels of the previous frame or the current frame, the edge detection including:

calculating a gradient level value for each pixel;

assigning each pixel to one of a plurality of gradient bins based on the calculated gradient level value for each pixel, the gradient bins being defined by a plurality of threshold values;

assigning one or more of the gradient bins as edge bins and one or more of the gradient bins as non-edge bins according to the number of pixels assigned to each gradient bin;

identifying pixels in the one or more edge bins as edge pixels and identifying pixels in the one or more non-edge bins as non-edge pixels;

the assigning one or more of the gradient bins being configured such that a minimum number of pixels are identified as edge pixels and no more than a maximum number of pixels are identified as edge pixels;

calculating a low pass motion vector based on the low pass component and a high pass motion vector based on the high pass component;

selecting between the low pass motion vector and the high pass motion vector for a pixel based in part on whether the pixel is identified as an edge pixel.

9. The method of claim 8, wherein the performing an edge detection further includes adjusting the plurality of threshold values that define the gradient bins for detecting edges in a subsequent frame according to a distribution of gradient level values.

10. The method of claim 9, wherein four gradient bins are utilized in performing an edge detection;

wherein a first gradient bin is always assigned as an non-edge bin;

wherein a fourth gradient bin is always assigned as a edge bin;

wherein a second gradient bin and a third gradient bin may each be assigned as either an non-edge bin or an edge bin.

11. The method of claim 10, wherein the minimum number of pixels to be identified as edge pixels is represented as X;

wherein the maximum number of pixels to be identified as edge pixels is represented as Y;

wherein the first gradient bin is defined by a gradient level value of zero and a threshold value, TH0, the first gradient bin containing gradient values (g) defined by $0<=g<=TH0$;

wherein a second gradient bin is defined by the threshold value, TH0, and a threshold value, TH1, the second gradient bin containing gradient values defined by $TH0<g<=TH1$;

wherein a third gradient bin is defined by the threshold value, TH1, and a threshold value, TH2, the third gradient bin containing gradient values defined by $TH1<g<=TH2$;

wherein a fourth gradient bin is defined by the threshold value, TH2, and includes all values greater than TH2, the fourth gradient bin containing gradient values defined by $TH2<g$;

wherein a value A is a number of pixels in the first gradient bin;

wherein a value D is a number of pixels in the fourth gradient bin;

wherein only the second gradient bin, the third gradient bin, and the fourth gradient bin are assigned as edge bins if A is greater than or equal to X;

wherein only the fourth gradient bin is assigned as an edge bin if A is less than X and D is greater than or equal to Y;

wherein only the third and fourth gradient bins are assigned as edge bins if A is less than X and D is less than Y.

12. The method of claim 9, wherein a first number of gradient bins are utilized in performing an edge detection;

wherein a first gradient bin is always assigned as an non-edge bin;

wherein a last gradient bin is always assigned as a edge bin;

wherein a plurality of intermediate gradient bins may each be assigned as either an non-edge bin or an edge bin;

wherein the minimum number of pixels to be identified as edge pixels is represented as X;

wherein the maximum number of pixels to be identified as edge pixels is represented as Y.

13. The method of claim 8, wherein calculating a low pass motion vector based on the low pass component and a high pass motion vector based on the high pass component includes:

performing a fast Fourier transform of the high pass component and low pass component of the previous frame data and the current frame data;

calculating a first phase difference between the high pass component of the current frame data and the high pass component of the previous frame data;

calculating a second phase difference between the low pass component of the current frame data and the low pass component of the previous frame data;

performing an inverse fast Fourier transform on the first phase difference and the second phase difference to generate a first inverse Fourier result and a second inverse Fourier result; and calculating a low pass motion vector based on the first inverse Fourier result and a high pass motion vector based on the second inverse Fourier result.

14. The method of claim 8, wherein the high pass motion vector is not selected for at least the first two frames following a scene change.

15. A system comprising:

an edge detector for detecting edges in a digital video frame including:

a gradient level value calculator to calculate a gradient level value for each pixel of the digital video frame;

a plurality of gradient bins configured to store pixels assigned to particular gradient bins based on the calculated gradient level value for each pixel, the gradient bins being defined by a plurality of threshold values;

a bin assigner configured to assign one or more of the gradient bins as edge bins and one or more of the gradient bins as non-edge bins according to the number of pixels assigned to each gradient bin, the bin assigner assigning bins such that a minimum number of pixels are contained in edge bins and no more than a maximum number of pixels are contained in non-edge bins;

an edge pixel identifier configured to identify pixels in the one or more edge bins as edge pixels and to identify pixels in the one or more non-edge bins as non-edge pixels.

16. The system of claim 15, wherein the edge detector further includes a distribution calculator configured to calculate a distribution of gradient level values for each of the pixels in the digital video frame, the distribution calculator being further configured to adjust the plurality of threshold values according to the distribution.

17. The system of claim 16, wherein the distribution calculator receives gradient level value scores for each pixels of the digital video frame, calculates a distribution of the gradient level value scores across population of pixels, and identifies certain percentile points in the distribution.

18. The system of claim 16, wherein the gradient level value calculator utilizes a Sobel edge detector.

19. The system of claim 16, further comprising:
a decomposition filter that receives previous frame data and current frame data, the decomposition filter comprising a high pass filter and a low pass filter; and
a motion vector calculator configured to generate a high pass motion vector based on outputs of the high pass filter and a low pass motion vector based on outputs of the low pass filter;
a motion vector selector configured to select from between the high pass motion vector and the low pass motion vector for a pixel based in part on whether the pixel is identified as an edge pixel.

20. The system of claim 19, wherein the motion vector calculator further comprises:
a fast Fourier transform calculator configured to generate low pass frequency domain representations of the previous frame data and the current frame data from the low pass filter output and high pass frequency domain representations of the previous frame data and the current frame data from the high pass filter output;
a phase difference calculator configured to calculate a first phase difference between the previous frame low pass frequency domain representation and the current frame low pass frequency domain representation, the phase difference calculator further configured to calculate a second phase difference between the previous frame high pass frequency domain representation and the current frame high pass frequency domain representation;
an inverse Fourier transform calculator configured to generate a first inverse Fourier result based on the first phase difference, the inverse Fourier transform calculator further configured to generate a second inverse Fourier result based on the second phase difference; and
a motion vector calculator configured to generate the low pass motion vector based on the first inverse Fourier result and the high pass motion vector based on the second inverse Fourier result.

* * * * *